(12) United States Patent
Nagae

(10) Patent No.: US 7,595,945 B2
(45) Date of Patent: Sep. 29, 2009

(54) LENS APPARATUS AND IMAGE-TAKING APPARATUS

(75) Inventor: Ryuichi Nagae, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 35 days.

(21) Appl. No.: 11/236,972

(22) Filed: Sep. 28, 2005

(65) Prior Publication Data
US 2006/0066960 A1    Mar. 30, 2006

(30) Foreign Application Priority Data
Sep. 28, 2004    (JP)    ............... 2004-282194

(51) Int. Cl.
G02B 7/02    (2006.01)
G02B 15/14    (2006.01)

(52) U.S. Cl. ............... 359/823; 359/822; 359/699; 359/700

(58) Field of Classification Search ............... 359/819, 359/821–823, 811, 813, 699, 700, 703, 704
See application file for complete search history.

(56) References Cited

U.S. PATENT DOCUMENTS
2004/0085473 A1* 5/2004 Iida ............... 348/335
2005/0185951 A1* 8/2005 Terada et al. ............... 396/535

FOREIGN PATENT DOCUMENTS
JP    2000-292671    * 4/1999

* cited by examiner

Primary Examiner—Ricky L Mack
Assistant Examiner—Brandi N Thomas
(74) Attorney, Agent, or Firm—Cowan, Liebowitz & Latman, P.C.

(57) ABSTRACT

A lens apparatus is disclosed, which has a simple structure effective for preventing the disengagement of a cam follower from a cam groove portion against external forces in various directions. The lens apparatus comprises a first member having a cam groove portion on its cylindrical surface, a plurality of cam follower members each having an engagement portion which engages with the cam groove portion, and a second member holding the plurality of cam follower members in its circumferential direction. At least one of the plurality of cam follower members has a protrusion portion opposed to the cylindrical surface, and the interval between the cylindrical surface and the protrusion portion is smaller than that of the bottom surface of the cam groove portion and the end surface of the engagement portion.

9 Claims, 4 Drawing Sheets

LENS APPARATUS AND IMAGE-TAKING APPARATUS

FIELD OF THE INVENTION

The present invention relates to a lens apparatus used with image-taking apparatuses such as digital cameras.

BACKGROUND OF THE INVENTION

Many of image-taking apparatuses are capable of changing the focal length by telescopic motion of their lens barrel in the optical axis direction. In such image-taking apparatuses, their normal operations are required even if the lens barrel receives an external force by hitting of the lens barrel protruded from the apparatus body against objects and person's bodies or by dropping of the apparatus on the ground when carrying the apparatus.

Many of telescopic lens barrels are constituted by a cam barrel provided with a cam groove portion, a lens holding barrel holding a cam follower which engages with the cam groove portion, and the like; the cam barrel and lens holding barrel move relatively. If the above-mentioned external force acts on such a lens barrel, there is a possibility that it cannot be driven because of disengagement of the cam groove portion and the cam follower.

As a measure against this, a lens barrel capable of preventing disengagement of a cam follower from a cam groove portion is disclosed in Japanese Patent Laid-Open No. H06-250063. In this lens barrel, when the lens barrel receives an external force in the optical axis direction, the cam follower biased to the cam groove portion is pressed along an inclined cam surface of the cam groove portion, and a cam follower holding portion of a lens holding frame contacts the cam surface of the cam groove portion, thereby preventing the disengagement of the cam follower and the cam groove portion.

In addition, another lens barrel capable of preventing disengagement of a cam follower from a cam groove portion against an external force in the optical axis direction is disclosed in Japanese Patent Laid-Open No. 2003-15013. In this lens barrel, two inclined surfaces having different angles are provided on the cam follower, and two cam surfaces corresponding to the inclined surfaces are provided on the cam groove portion.

However, the structures disclosed in the above-mentioned publications tend to invite increases in size and production costs of the lens barrel because they require a plurality of parts and a complicated configuration in each of the cam follower and cam groove portion, and in the circumference thereof.

In addition, there is a possibility that the cam barrel or cam follower holding member displaces itself outward in its diameter direction, that is, a direction orthogonal to the optical axis by slipping between the inclined surfaces of the cam follower and cam groove portion in a case where the external force acts on the lens barrel in the optical axis direction. In this case, it is not possible to prevent the disengagement of the cam follower from the cam groove portion in the structures disclosed in the above-mentioned publications.

Furthermore, though the structure disclosed in Japanese Patent Laid-Open No. 2003-15013 is effective for the external force from the front (object side) of the lens barrel, it is not effective for the external force from the rear (camera body side). The image-taking apparatuses are often used with a strap. However, there is a possibility that a pulling force acts on the lens barrel from the rear when a user pulls the strap up at the moment of dropping of the image-taking apparatus with the strap in hand.

BRIEF SUMMARY OF THE INVENTION

An object of the present invention is to provide a lens apparatus having a simple structure effective for preventing the disengagement of a cam follower from a cam groove portion against external forces in various directions.

A lens apparatus as one aspect of the present invention comprises a first member having a cam groove portion on its cylindrical surface, a plurality of cam follower members each having an engagement portion which engages with the cam groove portion, and a second member holding the plurality of cam follower members in its circumferential direction. The first and second members move relatively in an optical axis direction. At least one of the plurality of cam follower members has a protrusion portion opposed to the cylindrical surface, and the interval between the cylindrical surface and the protrusion portion is smaller than that of the bottom surface of the cam groove portion and the end surface, which opposed to the bottom surface, of the engagement portion.

A lens apparatus as another aspect of the present invention comprises a first member having a cam groove portion on its cylindrical surface, a plurality of cam follower members each having an engagement portion which engages with the cam groove portion, and a second member holding the plurality of cam follower members in its circumferential direction. The first and second members move relatively in an optical axis direction. At least one of the plurality of cam follower members has a protrusion portion which contacts the cylindrical surface in a case where one of the first and second members displaces with respect to the other in a direction orthogonal to the optical axis direction.

Other objects and further features of the present invention will become readily apparent from the following description of the preferred embodiments with reference to accompanying drawings.

DETAILED DESCRIPTION OF THE PREFERRED EMBODIMENTS

A description will now be given of the preferred embodiments of the present invention by referring to the accompanying drawings.

Figure 1:
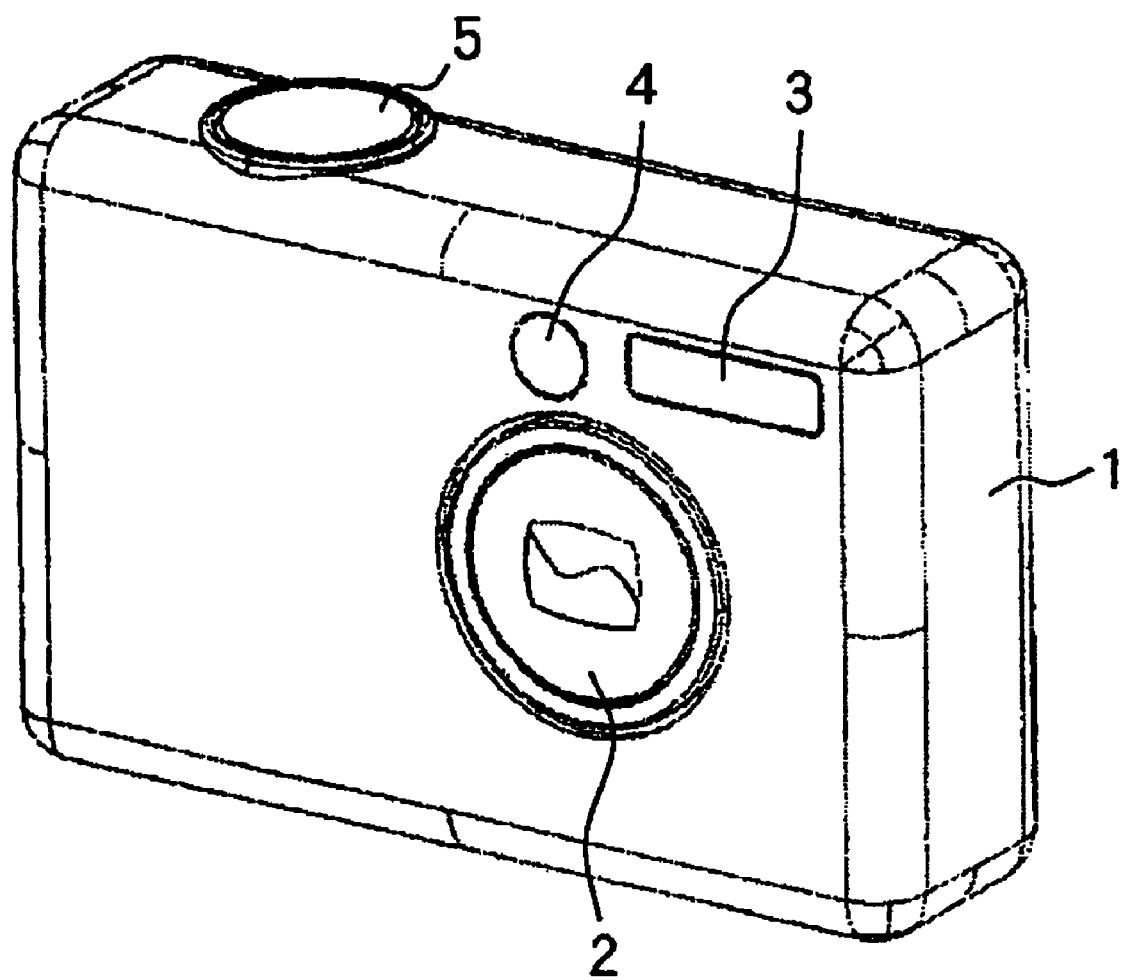
FIG. 1 is an oblique perspective view showing the camera with the lens apparatus that is an embodiment of the present invention.

FIG. 1 shows a camera (image-taking apparatus) with a lens barrel (lens apparatus) that is an embodiment of the present invention. In FIG. 1, 1 denotes a camera body. The lens barrel 2 which can change the focal length of the image-taking optical system by extending and retracting in the optical axis direction is provided on the front of the camera body 1.

In addition, a light-emitting window 3 of an illumination unit which illuminates an object is provided on the front of the camera body 1. Furthermore, a finder window 4 is provided beside the light-emitting window 3.

Moreover, a release button 5 for starting an image-taking preparation operation (including a focusing operation and photometric operation) and an image-taking operation (exposure of the image-taking element) is provided on the top of the camera body 1.

Figure 2:
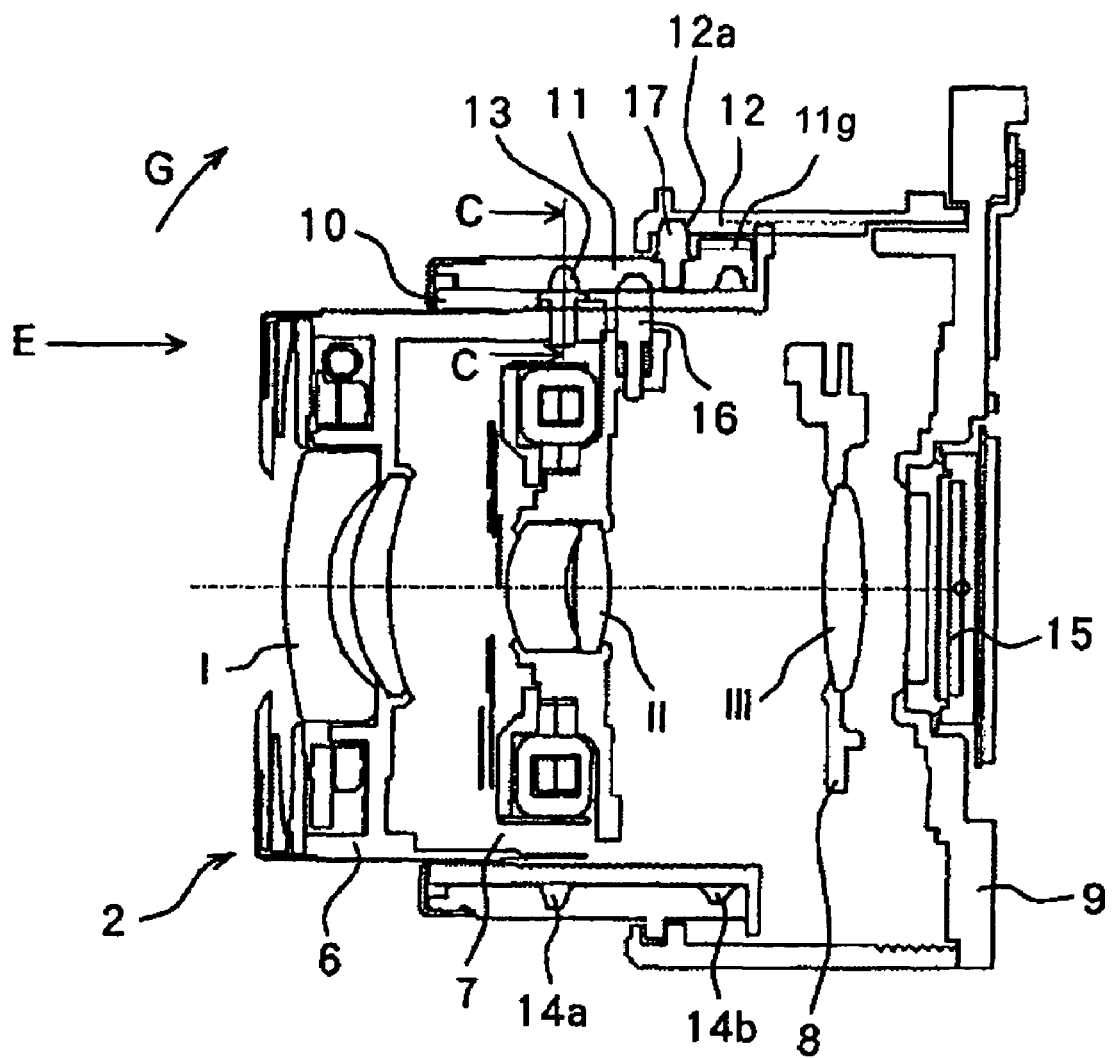
FIG. 2 is a sectional view of the lens apparatus of the embodiment along its optical axis.

FIG. 2 shows a sectional view of the lens barrel 2 in its extended state. In FIG. 2, 6 denotes a first lens holding barrel (second member) holding the most-front lens unit I, 7 denotes a second lens holding barrel holding a shutter unit and a second lens unit II, 8 denotes a third holding frame holding a third lens unit III, and 9 denotes a base member holding an image-pickup element that photoelectrically converts object images such as a CCD sensor or a CMOS sensor.

10 denotes a linearly-moving barrel moving linearly with respect to the fixed barrel 12 in the optical axis direction, and guiding the first lens holding barrel 6 in the optical axis direction. The linearly-moving barrel 10 is provided inside of the fixed barrel 12. 11 denotes a movable cam barrel which is disposed between the fixed barrel 12 and the linearly-moving barrel 10. A first cam groove portion 14a and a second cam groove portion 14b are formed on the inner circumferential surface of the movable cam barrel 11. The first cam groove portion 14a is used for driving the first lens holding barrel 6 in the optical axis direction, and the second cam groove portion 14b is used for driving the second lens holding barrel 7 in the same direction.

The first and second cam groove portions 14a and 14b generally have a V-sectional shape in which the width becomes narrower from its opening side (inner circumferential surface side of the movable cam barrel 11) toward its bottom side (outer circumferential surface side of the movable cam barrel 11), and its both side surfaces are inclined cam surfaces.

The movable cam barrel 11 is rotatable with respect to the linearly-moving barrel 10, and is movable integrally with the linearly-moving barrel 10 in the optical axis direction.

The fixed barrel 12 is fixed to the base member 9, and a cam groove portion 12a which drives the movable cam barrel 11 in the optical axis direction is formed inside of the fixed barrel 12.

The first lens holding barrel 6 is arranged between the movable cam barrel 11 and the linearly-moving barrel 10. A plurality of cam pins (cam follower members) 13 which engage with the first cam groove portion 14a of the movable cam barrel 11 are provided on the outer circumferential surface of the first lens holding member 6 in its circumferential direction (three cam pins are provided substantially equiangularly in this embodiment).

Moreover, a cam pin 16 which engages with the second cam groove portion 14b of the movable cam barrel 11 is provided on the outer circumferential surface of the second lens holding member 7. A cam pin 17 which engages with the cam groove portion 12a of the fixed barrel 12 is provided on the outer circumferential surface of the movable cam barrel 11.

In the lens barrel 2 constructed as above, when a driving force from a driving mechanism, not shown, is transmitted to a gear portion 11g formed at the rear end of the outer circumferential surface of the movable cam barrel 11, the movable cam barrel 11 is rotated and moved in the optical axis direction by the engagement action between the cam groove portion 12a and the cam pin 17. The linearly-moving barrel 10 is moved integrally with the movable cam barrel 11.

When the movable cam barrel 11 is rotated, the engagement action of the first and second cam groove portions 14a and 14b and the cam pins 13 and 16 moves the first and second lens holding barrels 6 and 7, which are guided by the linearly-moving barrel 10, in the optical axis direction. Thereby, the lens barrel 2 extends and retracts with respect to the camera body 1, and the focal length of the image-taking optical system constituted by the first to third lens units I to III is changed.

Figure 3:
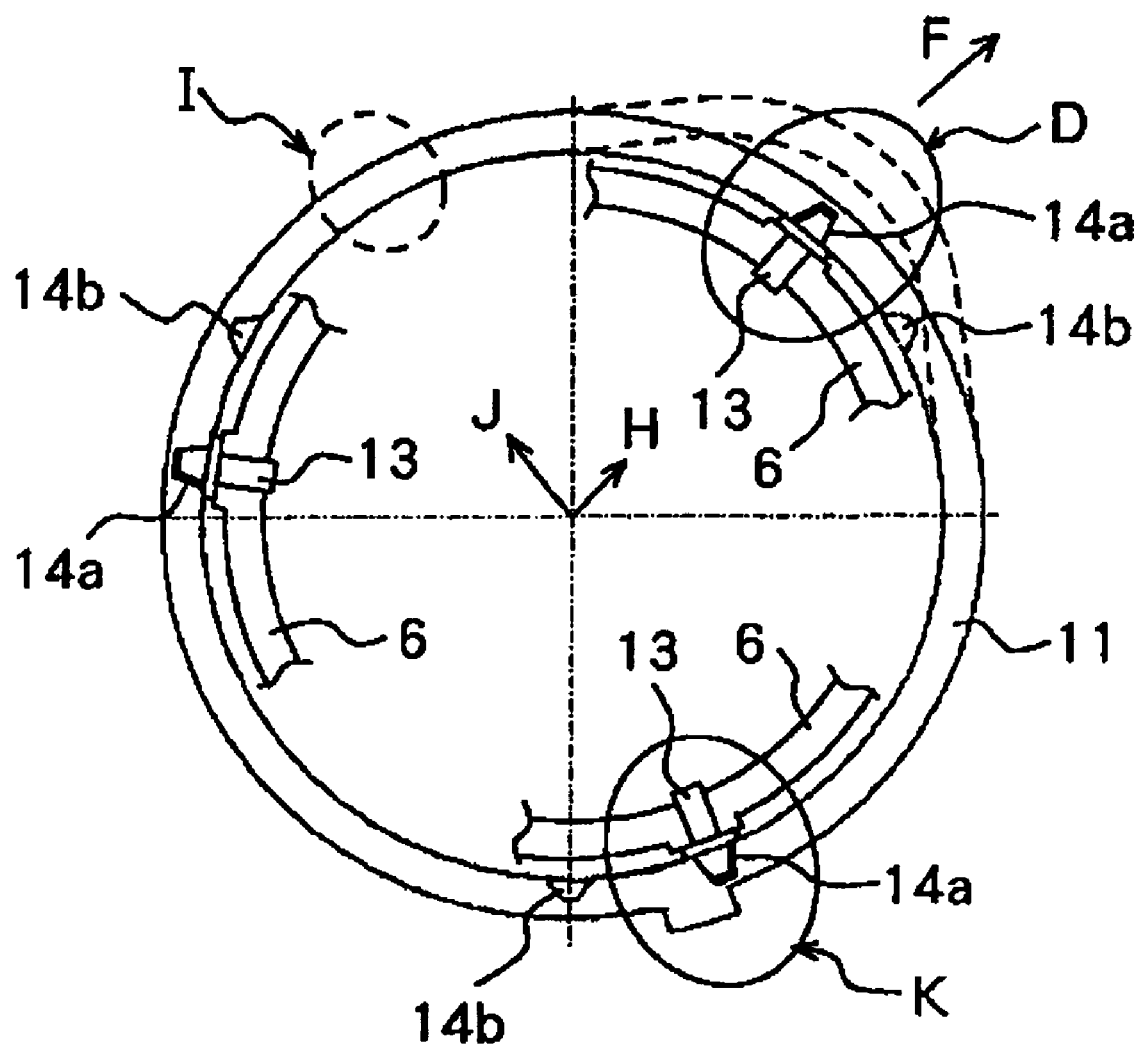
FIG. 3 is a sectional view of the lens apparatus along the line C-C in FIG. 2.
Figure 4:
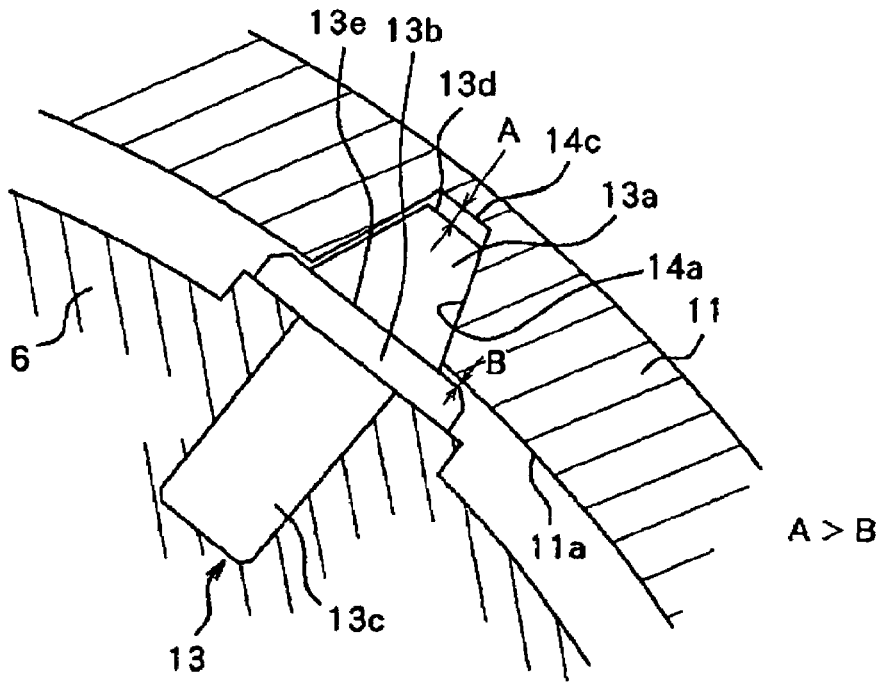
FIG. 4 is an enlarged view of part D in FIG. 3.

Next, the description will be given of the configuration of the cam pins 13 and the circumference thereof. FIG. 3 shows a section along the line C-C in FIG. 2. FIG. 4 shows an enlarged view of part D in FIG. 3 in a state in which a substantial relative displacement of the first lens holding barrel 6 and the movable cam barrel 11 does not occur in the direction orthogonal to the optical axis. Hereinafter, this state is referred to as a non-displaced state.

The 'displacement' in the present embodiment includes a parallel displacement of the movable cam barrel 11 or the first lens holding barrel 6 in the direction orthogonal to the optical axis, and a rotational displacement including a displacement of the movable cam barrel 11 or the first lens holding barrel 6 in the direction orthogonal to the optical axis. The 'direction orthogonal to the optical axis' means not only the direction completely orthogonal to the optical axis, but also a direction including a directional component orthogonal to the optical axis. In FIGS. 3 and 4, only the first lens holding barrel 6, cam pin 13 and movable cam barrel 11 are shown for simplifying the description.

In FIG. 3, as described above, the cam pins 13 are provided on the outer circumferential surface of the first lens holding barrel 6 at three positions in the circumferential direction. The first cam groove portion 14a corresponding to the three cam pins 13 is provided on the inner circumferential surface of the movable cam barrel 11.

As shown in FIG. 4, the cam pin 13 has, in order from the outside of the diameter direction, an engagement portion 13a having a shape of circular truncated cone and engaging with the first cam groove portion 14a, a flange portion (protrusion portion) 13b having a diameter larger than the maximum diameter of the engagement portion 13a, and a shank portion 13c held by press fitting into a hole formed in the first lens holding barrel 6. The outer circumferential surface of the engagement portion 13a is formed as a single surface, that is, a continuous surface having a circular conical shape.

In the non-displaced state, there is an interval A between the bottom surface 14c of the first cam groove portion 14a and the end surface 13d, which is opposed to the bottom surface 14c, of the engagement portion 13a on the cam pin 13. Further, there is an interval B between the outer end portion 13e of the flange portion 13b and the inner circumferential surface 11a of the movable cam barrel 11. These intervals forms clearances for preventing the cam pin 13 and the movable cam barrel 11 from rubbing with each other when they move relatively. Thereby, the cam pin 13 and the movable cam barrel 11 can smoothly move relatively without abnormal noises.

The interval B between the outer end surface 13e of the flange portion 13b and the inner circumferential surface 11a of the movable cam barrel 11 changes in a direction of the diameter of the outer end surface 13e of the flange portion 13b because the outer end surface 13e of the flange portion 13b is a plane and the inner circumferential surface 11a of the movable cam barrel 11 is a cylindrical surface. However, the interval B herein is a minimum interval between thereof. Although the interval B is an interval between the most-outer circumferential portion of the outer end surface 13e in its diameter direction and the inner circumferential surface 11a in this embodiment, another minimum interval may be provided.

In FIG. 2, in a case where an external force acts on the first lens holding barrel 6 from the front side of the optical axis direction shown by the arrow E, and the external force acts on the portion D in FIG. 3, an external force acts on the portion D from the obverse side of the paper of FIG. 4. In this case, the movable cam barrel 11 is deformed in the direction of the arrow F as shown by the dashed line in FIG. 3 by slipping between the inclined surface (circular conical surface) of the engagement portion 13a of the cam pin 13 and the inclined cam surface of the first cam groove portion 14a. In other words, the external force acting on the portion D is converted into an external force that acts on the movable cam barrel 11 in the direction orthogonal to the optical axis. In accordance with this, the movable cam barrel 11 is rotated in the direction of G in FIG. 2. In other words, the movable cam barrel 11 is rotationally displaced with respect to the first lens holding barrel 6 in the direction orthogonal to the optical axis.

Assuming that the flange portion 13b is not provided on the cam pin 13, or the interval A is smaller than the interval B, the engagement portion 13a of the cam pin 13 will drop out of the first cam groove portion 14a in the portion D by the above-described deformation of the movable cam barrel 11.

Figure 5:
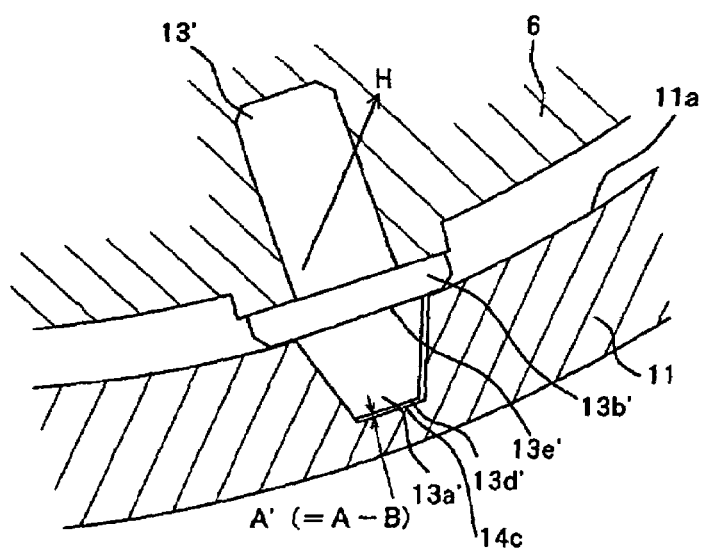
FIG. 5 is an enlarged view of part K (in an eccentric state) in FIG. 3.

However, in a case where the interval A is larger than the interval B as shown in the present embodiment, when the movable cam barrel 11 is rotated in the direction of G in FIG. 2, the inner circumferential surface 11a of the movable cam barrel 11 contacts the flange portions 13b' (the outer end surface 13e') of the two other cam pins 13' provided at positions other than the portion D, as shown in the portion K in FIG. 5 that is an enlarged view of FIG. 3 (only one of the two other cam pins 13' is shown in FIG. 5). Thereby, the movable cam barrel 11 pushes the two cam pins 13' in the direction of H in FIGS. 3 and 4, which is the direction of the deformation and rotational displacement of the movable cam barrel 11.

In this state, since an interval A' (=A−B) is left between the bottom surface 14c of the first cam groove portion 14a and the end surface 13d, which is opposed to the bottom surface 14c, of the engagement portion 13a on the cam pin 13, and the bottom surface 14c of the first cam groove portion 14a and the end surface 13d are apart from each other, the contact between the outer end surface 13e' of the flange portions 13b' and the inner circumferential surface 11a of the movable cam barrel 11 is not prevented.

The push of the two cam pins 13' by the movable cam barrel 11 results in an eccentric movement of the first lens holding barrel 6 in the direction of H in FIG. 3. The direction of H is a direction of the movement for restoring the engagement amount between the first cam groove portion 14a and the engagement portion 13a of the cam pin 13 with respect to the cam pin 13 shown in FIG. 3. Therefore, the dropout of the cam pin 13 in the portion D from the first cam groove portion 14a is prevented.

On the other hand, in a case where an external force acts on the portion I in FIG. 3, the three cam pins 13 are pushed in the direction of J by the movable cam barrel 11, and an eccentric movement thereof occurs. Therefore, the dropout of each cam pin 13 from the first cam groove portion 14a is also prevented.

Furthermore, in a case where an external force acts on the first lens holding barrel 6 or the movable cam barrel 11, and the rotational displacement thereof occurs, the dropout of each cam pin 13 from the first cam groove portion 14a is also prevented.

As described above, according to the present embodiment, it is possible to achieve a lens barrel which is rigid against external forces with a simple configuration in which the flange portion 13b is provided on the cam pin 13 and the above-described interval A is larger than the interval B. This makes it possible to prevent an increase in size of the lens barrel and the entire camera.

Furthermore, in the present embodiment, since the surface, which contacts the cam surface of the cam groove portion 14a, of the engagement portion 13a of the cam pin 13 is constituted by a single inclined surface (circular conical surface), it is possible to prevent the disengagement of the cam pin against external forces in various directions.

In other words, according to the present embodiment, in a case where one of the first and second members displaces with respect to the other in the direction orthogonal to the optical axis, the protrusion portion of at least one of the cam follower members contacts the cylindrical surface of the first member, thereby deforming the other member to maintain the engagement between the other cam follower member and the cam groove portion. Therefore, it is possible to effectively prevent the disengagement of each cam follower member from the cam groove portion against the external force with a simple structure.

Moreover, the single circular conical shape of the surface, which contacts the cam groove portion, of the engagement portion makes it possible to effectively prevent the disengagement of the cam follower member from the cam groove portion against external forces in various directions.

The above-mentioned embodiment is an example for putting the present invention into practice. The present invention can be applied to lens apparatuses and interchangeable lenses for cameras having a configuration other than that of the above-mentioned embodiment.

Further, though the description was made of the cam pin 13 provided on the first lens holding member 6 in the above-mentioned embodiment, the present invention can be also applied to the other cam pins provided in the lens barrel 2.

Moreover, though the description was made of the case where the present invention was applied to all of the three cam pins 13 in the above-mentioned embodiment, the present invention may be applied to at least one of the three cam pins.

Furthermore, the description was made of the case where the cam groove portion is formed on the inner circumferential surface of the cam barrel 11, and the cam pins are provided on the outer circumferential surface of the first lens holding barrel 6 that is arranged inside of the cam barrel 11 in the above-mentioned embodiment. However, the present invention can be applied to a case where the cam groove portion is formed on the outer circumferential surface of the cam barrel, and the cam pins are provided on the inner circumferential surface of the barrel member that is arranged outside of the cam barrel.

Furthermore, though the description was made of the case where the bottom surface of the cam groove portion and the end surface, which is opposed to the bottom surface, of the cam pin have a planer shape, they can be formed in a curved surface shape in the present invention.

This application claims foreign priority benefits based on Japanese Patent Application No. 2004-282194, filed on Sep. 28, 2004, which is hereby incorporated by reference herein in its entirety as if fully set forth herein.

What is claimed is:
1. A lens apparatus comprising:
a first member having a cam groove portion on its cylindrical surface; and
a second member holding a cam follower member which has an engagement portion engaging with the cam groove portion, the first and second members moving relatively in an optical axis direction, wherein the cam follower member has a peripheral portion which projects from the second member at a position facing the cylindrical surface, in a state in which the engagement portion is engaged with the cam groove portion and in a direction orthogonal to the optical axis direction, the interval between the cylindrical surface and the peripheral portion is smaller than that between the bottom surface of the cam groove portion and the end surface, which faces the bottom surface, of the engagement portion, and the peripheral portion is contactable to the cylindrical surface when one of the first and second members displaces with respect to the other in the direction orthogonal to the optical axis direction.

2. The lens apparatus according to claim 1, wherein the cylindrical surface is the inner circumferential surface of the first member.

3. The lens apparatus according to claim 1, wherein the surface, which contacts the cam groove portion, of the engagement portion has a conical shape.

4. An image-taking apparatus comprising:
the lens apparatus according to claim 1; and
an image-pickup element photoelectrically converting an object image formed by the lens apparatus.

5. A lens apparatus comprising:
a first member having a cam groove portion on its cylindrical surface;
a second member holding a cam follower member which has an engagement portion engaging with the cam groove portion, the first and second members moving relatively in an optical axis direction, wherein the cam follower member has a peripheral portion which projects from the second member at a position facing the cylindrical surface, and in a state in which the engagement portion is engaged with the cam groove portion and in a direction orthogonal to the optical axis direction, the peripheral portion contacts the cylindrical surface but an end face, which faces a bottom surface of the cam groove portion, of the engagement portion does not contact the bottom surface when one of the first and second members displaces with respect to the other in the direction orthogonal to the optical axis direction.

6. The lens apparatus according to claim 5, wherein the peripheral portion stays away from the cylindrical surface in a case where the displacement amount of the peripheral portion in the direction orthogonal to the optical axis direction is smaller than a predetermined amount.

7. The lens apparatus according to claim 5, wherein the cylindrical surface is the inner circumferential surface of the first member.

8. The lens apparatus according to claim 5, wherein the surface, which contacts the cam groove portion, of the engagement portion has a conical shape.

9. An image-taking apparatus comprising:
the lens apparatus according to claim 5; and
an image-pickup element photoelectrically converting an object image formed by the lens apparatus.

* * * * *